(12) United States Patent
Simon

(10) Patent No.: US 8,208,580 B2
(45) Date of Patent: Jun. 26, 2012

(54) APPARATUS, SYSTEMS AND METHODS FOR PROVIDING ENHANCEMENTS TO ATSC NETWORKS USING SYNCHRONOUS VESTIGIAL SIDEBAND (VSB) FRAME SLICING

(75) Inventor: Michael Simon, Frederick, MD (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 298 days.

(21) Appl. No.: 12/418,072

(22) Filed: Apr. 3, 2009

(65) Prior Publication Data
US 2009/0193487 A1 Jul. 30, 2009

Related U.S. Application Data

(62) Division of application No. 11/276,473, filed on Mar. 1, 2006, now Pat. No. 7,672,399.

(60) Provisional application No. 60/657,416, filed on Mar. 2, 2005, provisional application No. 60/668,094, filed on Apr. 5, 2005.

(51) Int. Cl.
*H04L 27/00* (2006.01)
(52) U.S. Cl. ........................ 375/295; 375/299
(58) Field of Classification Search .................. 375/295, 375/299
See application file for complete search history.

(56) References Cited

U.S. PATENT DOCUMENTS

| | | | |
|---|---|---|---|
| 5,216,503 A | 6/1993 | Paik et al. | |
| 5,506,844 A | 4/1996 | Rao | |
| 5,614,914 A | 3/1997 | Bolgiano et al. | |
| 5,903,574 A | 5/1999 | Lyons | |
| 6,005,605 A | 12/1999 | Kostreski et al. | |
| 6,088,337 A | 7/2000 | Eastmond et al. | |
| 6,130,898 A | 10/2000 | Kostreski et al. | 370/522 |
| 6,192,070 B1 | 2/2001 | Poon et al. | |
| 6,269,092 B1 | 7/2001 | Schilling | |
| 6,313,885 B1 | 11/2001 | Patel et al. | 348/725 |
| 6,324,186 B1 | 11/2001 | Mahn | |
| 6,414,720 B1 | 7/2002 | Tsukidate et al. | |
| 6,477,180 B1 | 11/2002 | Aggarwal et al. | 370/368 |

(Continued)

FOREIGN PATENT DOCUMENTS

DE 199 60 295 6/2001

(Continued)

OTHER PUBLICATIONS

Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.

(Continued)

*Primary Examiner* — Curtis Odom
(74) *Attorney, Agent, or Firm* — Fitzpatrick, Cella, Harper & Scinto

(57) ABSTRACT

Systems, methods, apparatus and computer program products are provided for signaling to a receiver an availability of a service and a deterministic mapping of a service content corresponding to the service. A modulator receives a digital signal and generates a data frame from the digital signal, where the data frame is divided into segments, where at least one grouping of the segments contains the service content. The modulator modulates at least one grouping in accordance with the deterministic mapping. A receiving device receives a digital signal containing the availability of a service, the deterministic mapping corresponding to the service, and the service content, and performs an operation on the service content in accordance with the deterministic mapping.

7 Claims, 15 Drawing Sheets

U.S. PATENT DOCUMENTS

| | | | |
|---|---|---|---|
| 6,480,236 B1 | 11/2002 | Limberg | 348/555 |
| 6,496,477 B1 | 12/2002 | Perkins et al. | |
| 6,631,491 B1 | 10/2003 | Shibutani et al. | |
| 6,640,239 B1 | 10/2003 | Gidwani | |
| 6,721,337 B1 | 4/2004 | Kroeger et al. | |
| 6,772,434 B1 | 8/2004 | Godwin | |
| 6,801,499 B1 | 10/2004 | Anandakumar et al. | |
| 6,804,223 B2 | 10/2004 | Hoffmann et al. | |
| 6,816,204 B2 | 11/2004 | Limberg | |
| 6,862,707 B2 | 3/2005 | Shin | |
| 6,879,720 B2 | 4/2005 | Sarachik et al. | |
| 6,930,983 B2 | 8/2005 | Perkins et al. | |
| 7,110,048 B2 | 9/2006 | Weiss | 348/723 |
| 7,111,221 B2 | 9/2006 | Birru et al. | |
| 7,197,685 B2 | 3/2007 | Limberg | |
| 7,310,354 B2 | 12/2007 | Fimoff et al. | |
| 7,336,646 B2 | 2/2008 | Muller | |
| 7,349,675 B2 | 3/2008 | Karr et al. | |
| 7,382,838 B2 | 6/2008 | Peting | |
| 7,496,094 B2 | 2/2009 | Gopinath et al. | |
| 7,539,247 B2 | 5/2009 | Choi et al. | |
| 7,551,675 B2 | 6/2009 | Kroeger | |
| 7,564,905 B2 | 7/2009 | Park et al. | |
| 7,593,474 B2 | 9/2009 | Jeong et al. | |
| 7,599,348 B2 | 10/2009 | Kang et al. | |
| 7,667,780 B2 | 2/2010 | Weiss | |
| 7,672,399 B2 * | 3/2010 | Simon | 375/299 |
| 7,702,337 B2 | 4/2010 | Vare et al. | |
| 7,715,491 B2 | 5/2010 | Yu et al. | |
| 7,779,327 B2 | 8/2010 | Lee et al. | |
| 7,783,316 B1 | 8/2010 | Mitchell | |
| 7,830,974 B2 | 11/2010 | Choi et al. | |
| 7,852,961 B2 | 12/2010 | Chang et al. | |
| 7,856,590 B2 | 12/2010 | Kim et al. | |
| 7,953,160 B2 | 5/2011 | Gordon et al. | |
| 2001/0017849 A1 * | 8/2001 | Campanella et al. | 370/326 |
| 2002/0001349 A1 | 1/2002 | Bretl et al. | |
| 2002/0085548 A1 | 7/2002 | Ku et al. | |
| 2002/0097336 A1 | 7/2002 | Oshima | 348/487 |
| 2002/0140867 A1 | 10/2002 | Weiss | |
| 2003/0099303 A1 | 5/2003 | Birru et al. | |
| 2003/0201932 A1 | 10/2003 | Rabinowitz et al. | |
| 2003/0206596 A1 | 11/2003 | Carver et al. | |
| 2004/0062283 A1 | 4/2004 | Takeuchi et al. | |
| 2004/0160344 A1 | 8/2004 | Bretl et al. | |
| 2004/0240460 A1 | 12/2004 | Hwang et al. | 370/412 |
| 2005/0013249 A1 | 1/2005 | Kong et al. | 370/235 |
| 2005/0074074 A1 | 4/2005 | Limberg | |
| 2005/0084023 A1 | 4/2005 | Bott et al. | |
| 2005/0147186 A1 * | 7/2005 | Funamoto et al. | 375/324 |
| 2005/0207416 A1 | 9/2005 | Rajkotia | |
| 2005/0238100 A1 | 10/2005 | Hsiao et al. | |
| 2005/0249300 A1 | 11/2005 | Jeong et al. | |
| 2005/0249301 A1 | 11/2005 | Jeong et al. | |
| 2005/0259643 A1 | 11/2005 | Chuah et al. | 370/389 |
| 2006/0050770 A1 | 3/2006 | Wallace et al. | |
| 2006/0200852 A1 | 9/2006 | Simon | 725/118 |
| 2006/0244865 A1 | 11/2006 | Simon | 348/614 |
| 2006/0245516 A1 | 11/2006 | Simon | 375/295 |
| 2006/0246836 A1 | 11/2006 | Simon | 455/3.01 |
| 2007/0066272 A1 | 3/2007 | Vassiliou et al. | |
| 2007/0174880 A1 | 7/2007 | Fite et al. | |
| 2007/0189410 A1 | 8/2007 | Zeng | |
| 2007/0223612 A1 | 9/2007 | Simon | 375/265 |
| 2008/0247442 A1 | 10/2008 | Orlik et al. | |
| 2008/0273698 A1 | 11/2008 | Manders et al. | |
| 2009/0016435 A1 | 1/2009 | Brandsma et al. | |
| 2009/0201997 A1 | 8/2009 | Kim et al. | |
| 2009/0252266 A1 | 10/2009 | Heinemann et al. | |

FOREIGN PATENT DOCUMENTS

| | | |
|---|---|---|
| DE | 196 17 293 | 11/2001 |
| DE | 101 12 773 | 9/2002 |
| DE | 10 2006 015 393 | 10/2007 |
| EP | 0 837 609 A2 | 4/1998 |
| EP | 0 926 894 | 6/1999 |
| EP | 1 079 631 A1 | 2/2001 |
| EP | 1 670 150 | 6/2006 |
| EP | 1 753 249 A2 | 2/2007 |
| GB | 2 399 719 | 9/2004 |
| WO | WO-02/03728 | 1/2002 |
| WO | WO-03/009590 | 1/2003 |
| WO | WO-03/045064 | 5/2003 |
| WO | 2004062283 A1 | 7/2004 |
| WO | WO-2006/046107 | 5/2006 |
| WO | 2006/066617 A1 | 6/2006 |
| WO | WO-2006/084361 | 8/2006 |
| WO | WO-2007/046672 | 4/2007 |
| WO | WO-2008/042694 | 4/2008 |
| WO | WO-2009/016175 | 2/2009 |
| WO | WO-2010/000407 | 1/2010 |

OTHER PUBLICATIONS

International Preliminary Report on Patentability, PCT/US2006/020599, Nov. 30, 2007.

Lee, Y., et al., "ATSC Terrestrial Digital Television Broadcasting Using Single Frequency Networks", ETRI Journal, Apr. 2004, pp. 92-100, vol. 26, No. 2.

"ATSC Standard: Synchronization Standard for Distributed Transmission (A/110)", Advanced Television Systems Committee (Jul. 14, 2004).

"ATSC Standard: Synchronization Standard for Distributed Transmission, Revision A (A/110A)", Advanced Television Systems Committee (Jul. 19, 2005).

Whitaker, J. C., "Standard Handbook of Video and Television Engineering", Chapter 17.2 "ATSC DTV Received Systems", pp. 17-63 to 17-99 (2000).

"Lecture 4: Digital Television the DVB transport stream", obtained from http://www.abo.fi/~jbjorkqv/digitv/lect4.pdf (last visited May 4, 2006).

Wang, X. et al., "Transmitter Identification in Distributed Transmission Network and its Applications in Position Location and a New Data Transmission Scheme", NAB Broadcast Engineering Conference, Las Vegas, NV, p. 511-520 (Apr. 16-21, 2005).

Vogel, W. J., et al., "Propagation Effects and Satellite Radio Design", Paper No. 1445, Maastricht Exhibition and Congress Centre (MECC) Maastricht, the Netherlands (Aug. 17-24, 2002).

Patel, C. B., et al., "Proposal to ATSC Subcommittee T3/59 to Provide 8-VSB with a Repetitive-PN1023 Signal for Rapidly and Reliably Initializing Tracking in an Adaptive Equalizer Despite Adverse Multipath Conditions" (Apr. 12, 2001).

Raghunandan, K., "Satellite Digital Audio Radio Service (SDARS) System Architecture and Receiver Review", IEEE (Oct. 27, 2005).

Owen, H., "Proposed Modifications to ATSC Digital Television Standard to Improve Performance in the Face of Dynamic Multipath for both Fixed and Mobile Operation", Sarnoff Corporation, Princeton, NJ (Apr. 2, 2001).

"ATSC Technology Group Report: DTV Signal Reception and Processing Considerations", Doc. T3-600r4, Advanced Television Systems Committee (Sep. 18, 2003).

Proposal for Enhancement of ATSC RF Transmission System (Revision to A/53), submitted by Samsung, Draft ver. 1.0 (Sep. 16, 2004).

Citta, R., et al., "ATSC Transmission System: VSB Tutorial", Zenith Electronics Corporation, Symposium Handout, Montreuz Symposium (Jun. 12, 1997).

"ATSC Recommended Practice: Design of Synchronized Multiple Transmitter Networks (A/111)", Advanced Television Systems Committee (Sep. 3, 2004).

Lee, Y., et al., "ATSC Terrestrial Digital Television Broadcasting Using Single Frequency Networks", ETRI Journal, vol. 26, No. 2, pp. 92-100, Apr. 2004.

"ATSC Digital Television Standard (A/53) Revision E", Advanced Television Systems Committee (Dec. 27, 2005).

International Search Report and Written Opinion of the International Searching Authority, PCT/US06/07265, Sep. 4, 2007.

International Preliminary Report on Patentability and Written Opinion of the International Application, PCT/US2006/007265, Oct. 4, 2007.

International Preliminary Report on Patentability and Written Opinion of the International Searching Authority, PCT/US2006/022300, Dec. 27, 2007.

International Search Report and Written Opinion of the International Searching Authority, PCT/US06/20599, Aug. 31, 2007.

ATSC Standard: Synchronization Standard for Distributed Transmission (A/110), Advanced Television Systems Committee (Jul. 14, 2004).

International Search Report and Written Opinion of the International Searching Authority, PCT/US06/015317, May 14, 2008.

International Search Report and Written Opinion of the International Searching Authority, PCT/US06/0~7251, May 20, 2008.

"Digital Video Broadcasting (DVB); DVB mega-frame for Single Frequency Network (SFN) synchronization", European Broadcasting Union, ETSI TS 101 191 v1.4.1 (Jun. 2004).

"ATSC-Mobile DTV Standard, Part 3-Service Multiplex and Transport Subsystem Characteristics", Advanced Television Systems Committee, Inc., Document A/153 Part 3:2009, Oct. 15, 2009, pp. 14-25.

ATSC Digital Television Standard (A/53), "Annex D: RF/Transmission Systems Characteristics", Sep. 16, 1995, pp. 46-60.

"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

Office Action for Mexican Patent Application No. MX/a/2007/010579, dated Dec. 14, 2010.

* cited by examiner

FIG. 3
Prior Art

| Syntax | No. of Bits | Format |
|---|---|---|
| DTx_packet (){ | | |
|     reserved | 8 | 0xFF |
|     for (i=0; i<12; i++) { | | |
|         trellis_code_state | 8 | riuimsbfwp |
|     } | | |
|     synchronization_time_stamp | 24 | uimsbf |
|     maximum_delay | 24 | uimsbf |
|     network_identifier_pattern | 12 | uimsbf |
|     stream_locked_flag | 1 | bslbf |
|     reserved | 1 | '1' |
|     packet_number | 10 | uimsbf |
|     reserved | 32 | 0xFFFFFFFF |
|     tx_group_number | 8 | uimsbf |
|     for (i=0; i<16; i++) { | | |
|         tx_address | 12 | uimsbf |
|         tx_identifier_level | 3 | uimsbf |
|         tx_data_inhibit | 1 | bslbf |
|         tx_time_offset | 16 | tcimsbf |
|         tx_power | 12 | uipfmsbf |
|         reserved | 4 | '1111' |
|     } | | |
|     reserved | 320 | for (i=0; 1<40; i++) 0xFF |
|     DTxP_ECC | 160 | uimsbf |
| } | | |

− − −▶ Normal ATSC Lateral R-S Coding

── ▶ Enhanced Outer 2D R-S Coding

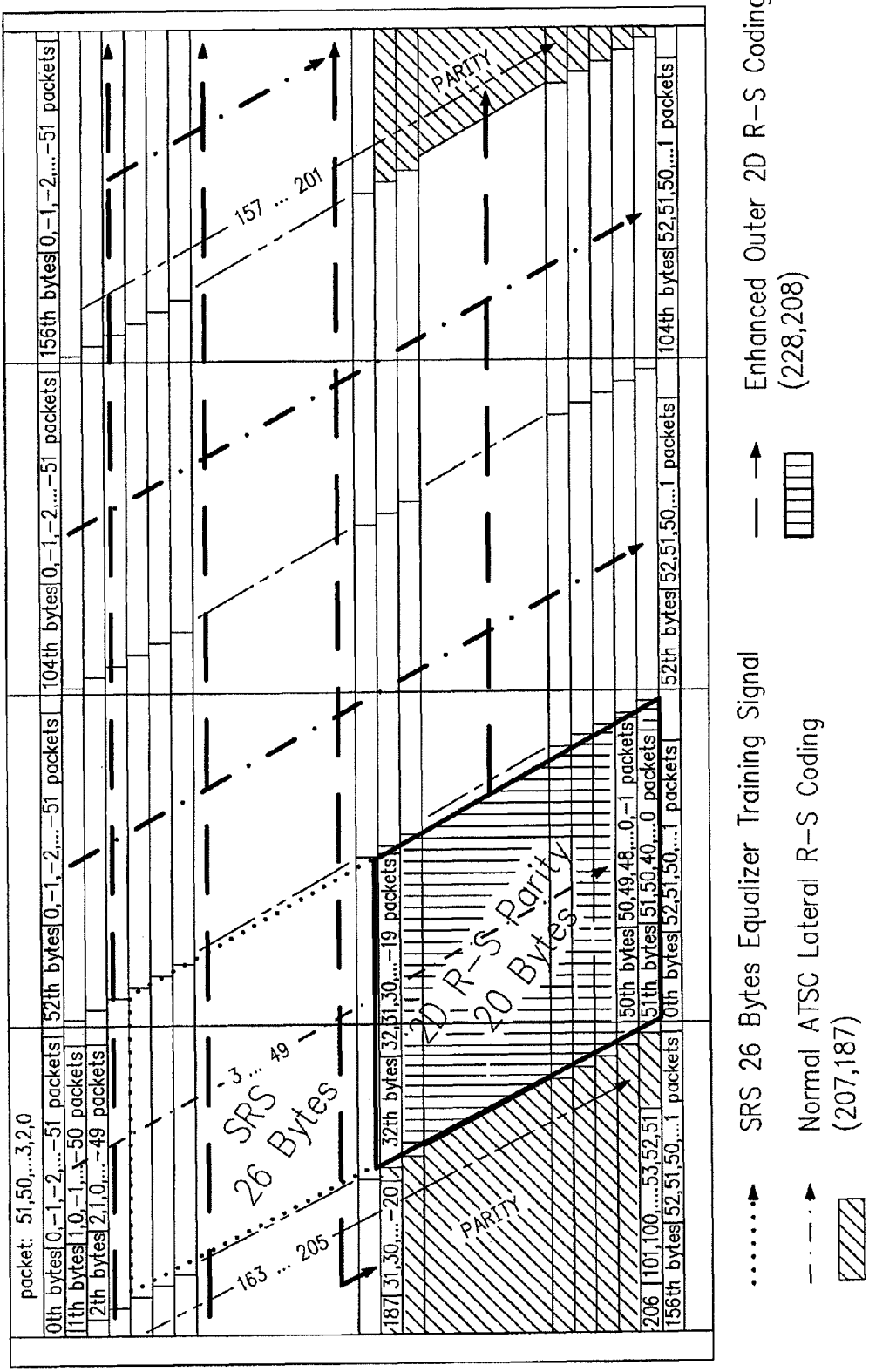
FIG. 17 Concept SRS (EQ Training) & 2D R-S

APPARATUS, SYSTEMS AND METHODS FOR PROVIDING ENHANCEMENTS TO ATSC NETWORKS USING SYNCHRONOUS VESTIGIAL SIDEBAND (VSB) FRAME SLICING

CROSS REFERENCE TO RELATED APPLICATIONS

This application is a division of U.S. application Ser. No. 11/276,473, filed Mar. 1, 2006, which is a non-provisional of U.S. Provisional Application Nos. 60/657,416, filed Mar. 2, 2005 and 60/668,094, filed Apr. 5, 2005, the entire disclosures of which is hereby incorporated by reference herein.

BACKGROUND OF THE INVENTION

1. Field of the Invention

The present invention generally relates to broadcasting networks, and more particularly to technology for providing enhancements to the broadcasting networks using synchronous vestigial sideband (VSB) frame slicing to deliver content.

2. Related Art

A single-frequency network (SFN) is a collection of transmitters operating on the same frequency for carrying the same information to receivers in a given area. The transmitters emit identical signals, several of which may be received more or less simultaneously by individual receivers. One advantage of using multiple transmitters instead of one powerful transmitter is that multiple transmitters provide alternate paths for the signal to enter a structure, such as a house, thereby providing better reception. In mountainous areas, for example, it may be difficult to find one location capable of serving all the population centers in the area, since they are often located in valleys. Multiple transmitters can be strategically placed to cover such small areas and fill in the gaps.

One application of SFNs is for transmission of digitally encoded data such as digital television (DTV), the system and related standards for which have been established by the Advanced Television Systems Committee ("ATSC"). Under the ATSC's DTV standard (or A/53 standard), hereby incorporated herein by reference in its entirety, it is possible to transmit large amounts of data including high definition pictures, high quality sound, multiple standard definition pictures, and other ancillary related or unrelated communications, which may be accessible by using a computer or television set.

The DTV standard includes the following layers: the video/audio layer, compression layer, transport layer, and the transmission layer. At the top of the hierarchy is the uncompressed digital signal in one of the various digital data formats (e.g., video/audio formats). The data stream that corresponds with the video/audio layer is known as the elementary stream.

The compression layer compresses the elementary stream into a bitstream with a lower data rate. In the ATSC DTV standard, MPEG-2 compression is used for the video and the Dolby AC-3 compression is used for the audio. The compressed bitstream, in turn, may be packetized and multiplexed with other bitstreams into a higher data rate digital bitstream in the transport layer by an multiplexer. The MPEG-2 transport protocol defines (among several other things) how to packetize and multiplex packets into an MPEG-2 transport stream. The result is a stream of highly compressed data packets in a multiplexed bitstream which may include multiple programs and/or multiple data signals.

The multiplexed bitstream from the transport layer is modulated onto a radio frequency (RF) carrier in the transmission layer by a transmission system. The terrestrial broadcast mode utilized in the current ATSC DTV standard to transmit digital signals over the airwaves is called eight-level Trellis Coded vestigial sideband (8T-VSB).

FIG. 1 is a block diagram of a well known Trellis-coded 8T-VSB transmitter 100 used in an RF transmission system. The transmitter receives the incoming data packets of interspersed video, audio, and ancillary data, and, using a data randomizer 102, randomizes the data to produce a flat, noise-like spectrum. A Reed-Solomon (RS) encoder 104, known for its good burst noise correction capability and data overhead efficiency, RS-encodes the randomized data to add parity bytes to the end of each data packet. In turn, the data is convolutionally interleaved (i.e., spread out) over many data segments by a byte data interleaver 106.

A pre-coder and Trellis encoder 108 (referred to in the specification hereafter as a "Trellis coder") add additional redundancy to the signal in the form of multiple data levels, creating multilevel data symbols for transmission. A synchronization insertion component 110 multiplexes the segment and frame synchronizations with the multilevel data symbols before a DC offset is added by a pilot insertion component 112 for creation of the low-level, in-phase pilot. Segment and frame synchronizations are not interleaved. A VSB modulator 114 provides a filtered intermediate frequency (IF) signal at a standard frequency, with most of one sideband removed. Finally, an RF upconverter 116 translates the signal to the desired RF channel.

Multipath propagation is a common problem in single transmitter broadcast environments because it places a burden on a receiver equalizer's ability to handle signal echoes. In a distributed transmission system, where multiple transmitters are utilized, the multipath propagation problem is compounded. It is necessary, therefore, to synchronize or adjust the timing of the SFN system to control the delay spread seen by receivers in areas of SFN induced multipath not to exceed delay handling range of receiver equalizers and become problematic.

In addition, the output symbols of each transmitter is based on the transport stream received, how this is then mapped into a Data Frame and the initial states of the Trellis coders, which are normally random. When the transmitters emit the same symbols as one another for the same data inputs, they are said to be made "coherent". If the transmitters in an SFN are not synchronized, they will not emit coherent symbols.

The ATSC has promulgated a standard, referred to as the A/110 standard, which provides rules for synchronization of multiple transmitters emitting Trellis-coded 8T-VSB signals in an SFN or distributed transmission system (DTx) to create a condition which allows multiple transmitters being fed by the same transport stream to produce coherent symbols. SFN and DTx are to be understood to be synonymous terms. The A/110 standard is hereby incorporated herein by reference in its entirety.

FIG. 2 shows a block diagram of an ATSC SFN system 200 using A/110 distributed transmission (DTx). SFN system 200 includes three elements: an external time and frequency reference (shown as GPS), a distributed transmission adapter (DTxA) 202 situated at the source end of the distribution (or studio-to-transmitter link (STL)) subsystem, and plural RF transmission systems 208. DTxA includes two basic blocks: a transmitter synchronization inserter 206 and a data processing model 204. Transmitter synchronization inserter 206 inserts information (described in more detail below) into the transport stream (TS). The data processing model 204 is a model of the data processing in an ATSC modulator which serves as a master reference to the slave synchronized data processing blocks 210 in the RF transmission systems 208. Generally, each RF transmission system 208 includes two blocks: synchronized data processing block 210 and signal processing and power amplification block 211, which collectively are sometimes referred to as a "modulator" 212. These low level stages of the transmitter are also generally referred to as the "exciter" component. Herein the terms exciter and modulator are use interchangeably.

In an ATSC SFN system each synchronized data processing block 210 also includes a Trellis-coded 8-VSB transmitter 100 discussed above with reference to FIG. 1. As shown in FIG. 2, the DTxA produces a transport stream (TS) and feeds this stream to all of the synchronized data processing blocks 210.

FIG. 3 shows the structure of a distributed transmission packet in accordance with the A/110 standard and FIG. 4 depicts a VSB data frame, which includes packets of data and forward error correction (FEC), and data field synchronization (DFS) fields.

The A/110 standard requires the following three ATSC system elements to be synchronized: 1. frequency synchronization of the pilot or carrier frequencies, 2. data frame synchronization, and 3. pre-coder and Trellis encoder (Trellis coder) synchronization. A description of how these three elements are synchronized in a group of separately located transmitters follows.

According to the A/110 standard, control of two specific transmitter frequencies is required. First the RF frequency of the transmitted signal, as measured by the frequency of its pilot, must be accurately controlled to maintain frequencies of the transmitters close enough to one another that the receiver is not over-burdened with apparent Doppler shift between the signals. The symbol clock frequency must be accurately controlled to allow the output symbol stream to maintain stable, relative, time offsets between transmitters in a network. A flag, stream_locked_flag, in the DTxP packet structure is used to identify one of two options for performing symbol frequency synchronization. This flag is a 1-bit field that indicates to a slave transmitter whether it is to lock its symbol clock frequency to the incoming transport stream clock frequency (normal ATSC methodology) or to lock its symbol clock frequency to the same external precision reference frequency used throughout the network (e.g., GPS).

Data frame synchronization requires all of the slave modulators 212 in an SFN to use the same transport stream (TS) packet to start a VSB data frame (FIG. 4). In the current ATSC A/110 standard, this is accomplished by using DTxA 202 by inserting a cadence signal. In particular, a cadence signal (CS) is inserted at a deterministic point in time, once every 624 packets, into the MPEG-2 transport stream from the DTxA to each of the modulators 212. Dividing the rate of CS by half produces a Data Field Sync (DFS). The A/53 standard specifies that the data randomizer 102, RS encoder 104, and data interleaver 106 and intra-segment interleaver in part of 108 in the slave synchronized data processing blocks 210 shall all slaved to DFS.

In addition, the A/110 standard provides that it is necessary to develop a state condition for the Trellis coder memories to be applied at a specific epoch in the data stream simultaneously by all RF transmission systems 208 in a network. According to the A/110 standard, "in order to put the pre-coders and trellis encoders of all the transmitters in a network in the same state at the same time, it is necessary to 'jam sync' them to the trellis coder model in the Distributed Transmission Adapter." In other words, Trellis coders cannot be synchronized by identifying an epoch in the transport stream (TS). Instead, to place the Trellis coders of all the transmitters in a network in the same states at the same time, a sample of all Trellis coder states in the data processing model 204 is captured, and this data is carried in an element of the DXP, Trellis_code_state (FIG. 3), from DTxA 202 to all the slave modulators 212.

At a later, deterministic point in time, the Trellis code states that have been extracted from the DXP are used to initialize the memory of each Trellis coder in the slave modulators 212, to the state of the data processing model 204 in DTxA 202. Once this has been performed, the modulator Trellis coders are synchronized and all the modulators 212 should produce "coherent symbols." In addition, the DTxA indicates operating mode to the transmitters and provides information to be transmitted in the data field sync data segment through a field rate side channel, which carries information updated regularly at a data field rate.

The method used by A/110 standard to achieve Trellis coder synchronization adds much complexity to the overall SFN distributed transmission system design by requiring the DTxA 202 to sample the data processing model's Trellis coder states. Moreover, the A/110 does not provide the ability to post process data in the modulator once it exits the DTxA. A change of one bit in data stream after DTxA will break the Trellis code synchronization scheme thus making it difficult, if not impossible, to add enhancements to ATSC standard A/53. Moreover, as more transmitters are added in a multi-tier (e.g., distributed-translator) scheme the complexity of an SFN under the A/110 standard grows since an additional data processing model 204 must be added for each tier. Thus, what is needed is a technology that is scalable in SFN applications without adding additional complexity or constraints on system extensibility of the overall system.

In addition, in response to broadcasters' calls for flexible use of digital TV spectrum, the ATSC has requested the industry to explore "enhancements" to the VSB scheme that lies at the core of its DTV standard. Such enhancements include enhanced reception on fixed/indoor devices, handheld (i.e., portable) and mobile devices, and broadcasting of both video and data to mobile communicators and other handheld equipment, and the like. Heretofore, there has not been proposed in response to the ATSC request a solution which advantageously utilizes the deterministic nature of the ATSC system.

Accordingly, another need exists to provide enhancements to both single transmitter networks as well as SFN which leverage the deterministic frame structure incorporated in these broadcast systems.

Given the foregoing, what is needed is a system, method and computer program product for apparatus, systems and methods for providing enhancements to ATSC networks.

BRIEF DESCRIPTION OF THE INVENTION

The present invention meets the above-identified needs by providing apparatus, systems, and methods for providing enhancements to ATSC networks using synchronous vestigial sideband (VSB) frame slicing.

An advantage of the present invention is that it is backward compatible with existing ATSC standards and legacy ATSC receivers.

Another advantage of the present invention is that it provides enhanced service content using bandwidth that would have been otherwise wasted.

Yet another advantage of the present invention is that it takes advantage of the deterministic nature of a synchronous transmission system.

In one aspect of the present invention, systems, methods, apparatus and computer code are provided for providing to a receiver a digital signal corresponding to a service. A receiver is signaled as to an availability of the service. Also signaled is a deterministic mapping of a service content corresponding to the service. Thus, the present invention provides knowledge to receiving devices as to the exact location of content as it resides in the physical layer of the transmission process. In other words, the present invention, among other things, provides a deterministic mapping which maps content at a physical layer.

In another aspect of the present invention, systems, methods, apparatus and computer code are provided for modulating. A digital signal is received and a data frame is generated. The data frame is divided into a predetermined number of segments where at least one grouping of the predetermined number of segments contains a service content. The grouping is modulated in accordance with a deterministic mapping.

In yet another aspect of the present invention, systems, methods, apparatus and computer code are provided for processing a digital signal in a receiver. A digital signal containing an availability of a service, a deterministic mapping corresponding to the service, and a service content are received. An operation on the service content is performed in accordance with the deterministic mapping.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 3 shows the structure of distributed transmission packet in accordance with the A/110 standard.

FIG. 17 depicts the memory map of a convolutional byte interleaver showing the dispersion of the parity and the dimension of encoding.

DETAILED DESCRIPTION

Figure 1:
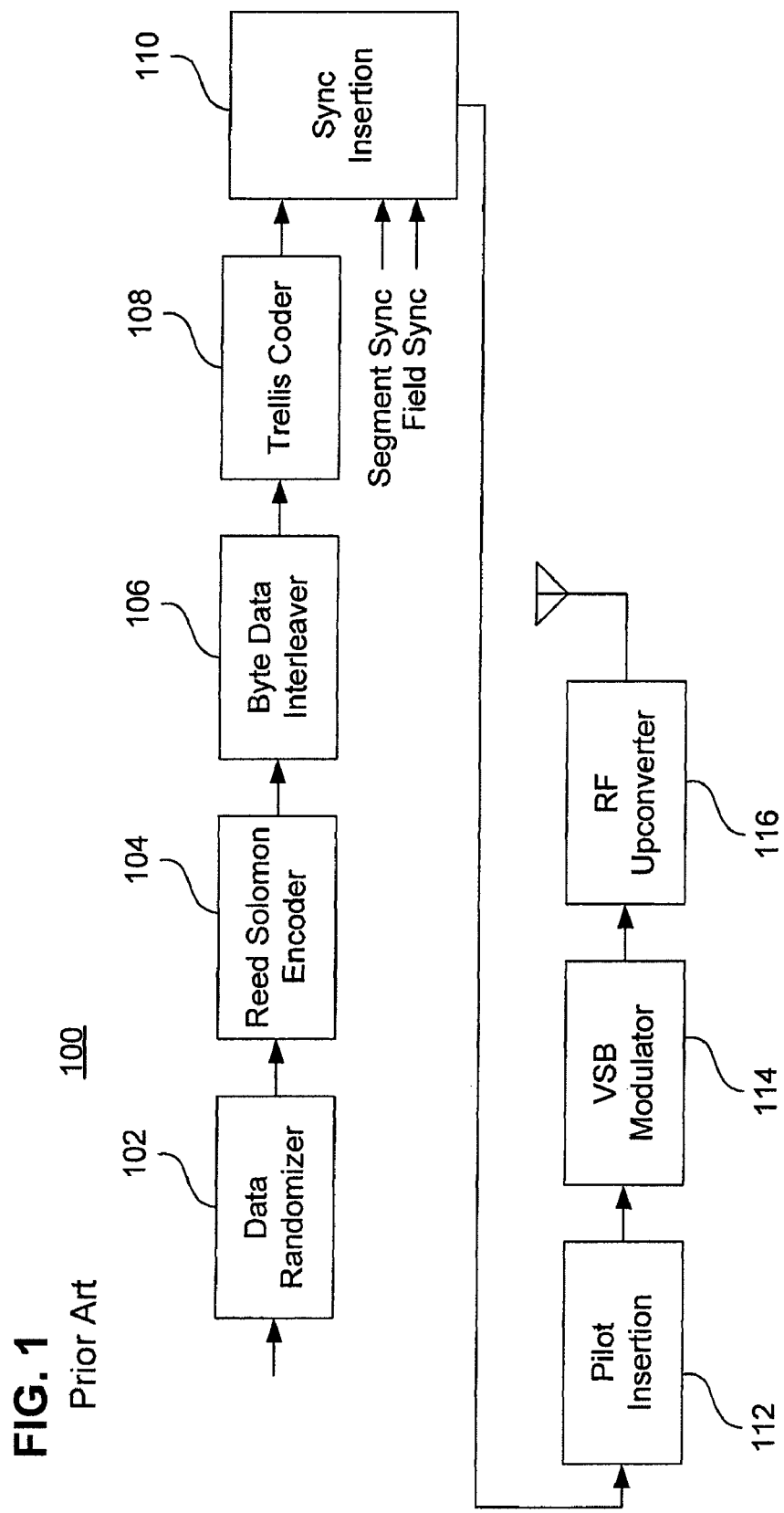
FIG. 1 is a block diagram of a Trellis-coded 8-VSB transmitter 100.
Figure 2:
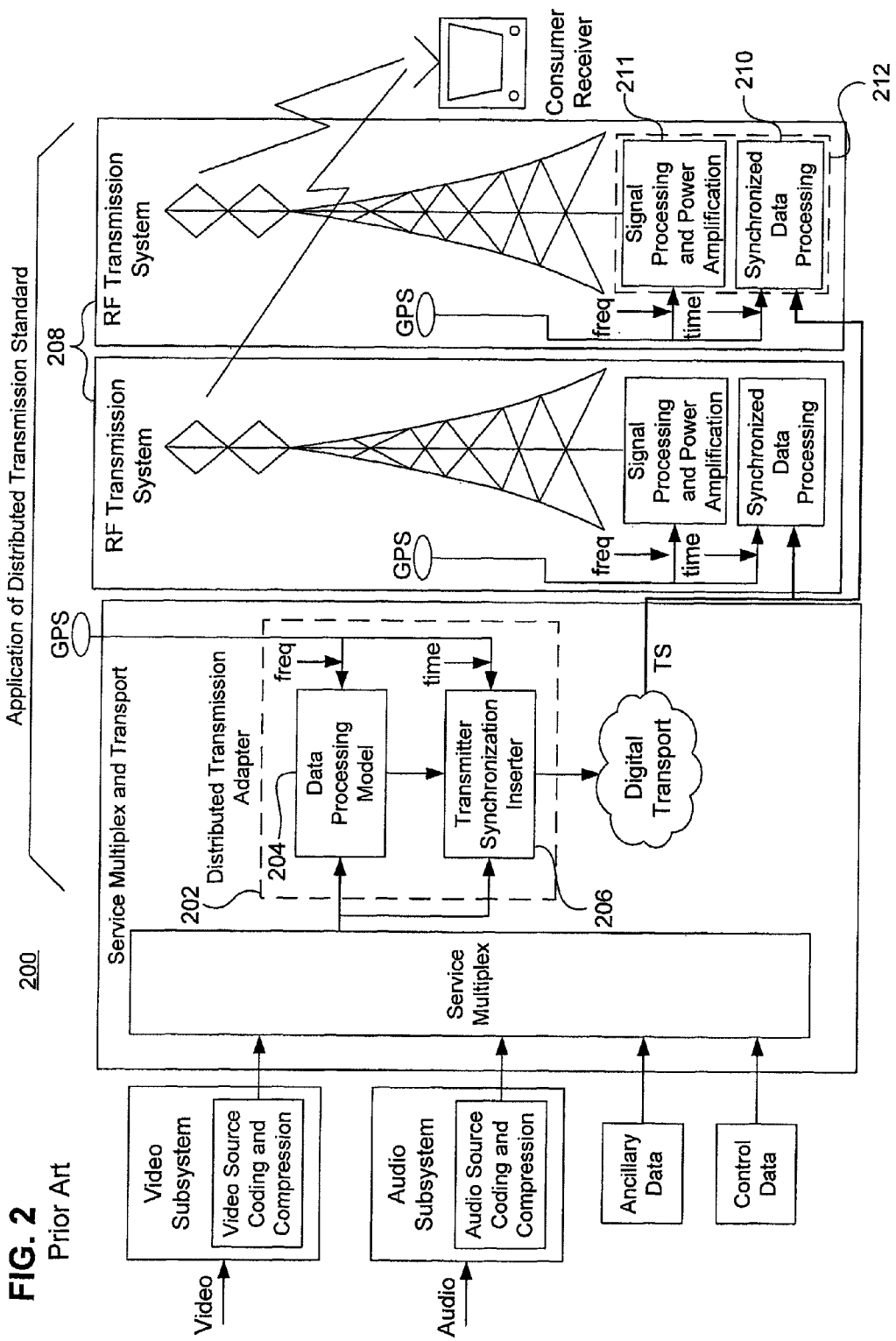
FIG. 2 shows a block diagram of an ATSC SFN system using A/110 distributed transmission where multiple Trellis coded 8T-VSB transmitters are fed by the same transport stream.
Figure 4:
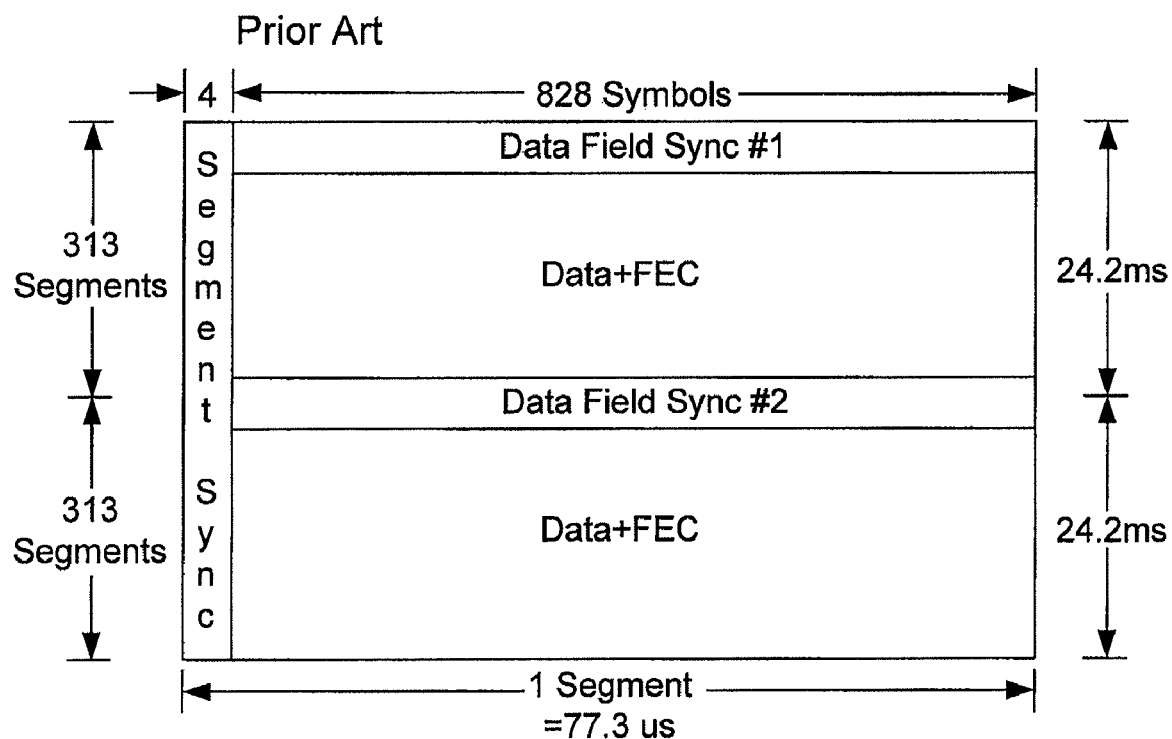
FIG. 4 depicts a VSB data frame in accordance with the ATSC A/53 standard.

The present invention is now described in more detail herein in terms of an exemplary system, method and apparatus for providing enhancements to ATSC networks using synchronous vestigial sideband (VSB) frame slicing in single transmitter networks and SFN. This is for convenience only and is not intended to limit the application of the present invention. In fact, after reading the following description, it will be apparent to one skilled in the relevant art(s) how to implement the following invention in alternative embodiments (e.g., multi-frequency networks).

Generally, the present invention performs the required ATSC synchronizations: 1. frequency synchronization of the pilot or carrier frequencies, 2. data frame synchronization, and 3. pre-coder/trellis coder synchronization.

Once data frame synchronization has been performed, the deterministic nature of how data packets will fall within a data frame is used to provide enhanced capabilities. More particularly, a multiplexer at the source end of the distribution (or studio-to-transmitter link (STL)) is utilized to group and/or preprocess packets that have been deterministically selected in accordance with a deterministic mapping. The groups (referred to hereafter as "slices") are then emitted by the multiplexer through a transport stream over a distribution network. As will be discussed below in more detail, the packets may be encoded and interspersed throughout a transport stream.

Service availability information is signaled by the multiplexer to a receiving device through an exciter. In one embodiment, a reserved area in the data field sync is utilized to communicate the signaling information to communicate available services and corresponding deterministic mappings.

The exciter sync insertion unit 110 is used to generate data frames having 624 segments. The present invention, deterministically maps the service content into slices defined as a predetermined number of segments of data (e.g., 52 segments). This number is derived by dividing a 624 segment VSB frame by a predetermined number of slices (e.g., 12).

Each slice contains service content corresponding to a particular service, such as to provide known sequences of data segments for training purposes, to provide data directed segments, encoding, and the like. A slice may also be used without enhancements and carry normal content instead.

Complementary devices receive the signaling information that identifies available services. If the service is provided more robust signaling, the complementary devices are configured to decode the data. In addition, these devices can perform other operations on the service content such as using it to improve power management services. Fixed services, such as digital television (Digital HDTV) can also be provided with enhanced services received from rooftop or indoor antennas.

Once a complementary receiver is frame synchronized it is configured with a priori knowledge of when the enhanced data packets will arrive within a data frame. With this information, the receivers can detect, decode and use the service content to control the enhanced features or provide additional content. As will be described in more detail below, mapping can be static or dynamic. A static based implementation supplies the service content to a receiver on a predetermined periodicity (or multiple thereof), whereas a dynamically based implementation supplies the service content for different services by signaling to the receiving device that the information is deterministically changing.

Figure 7:
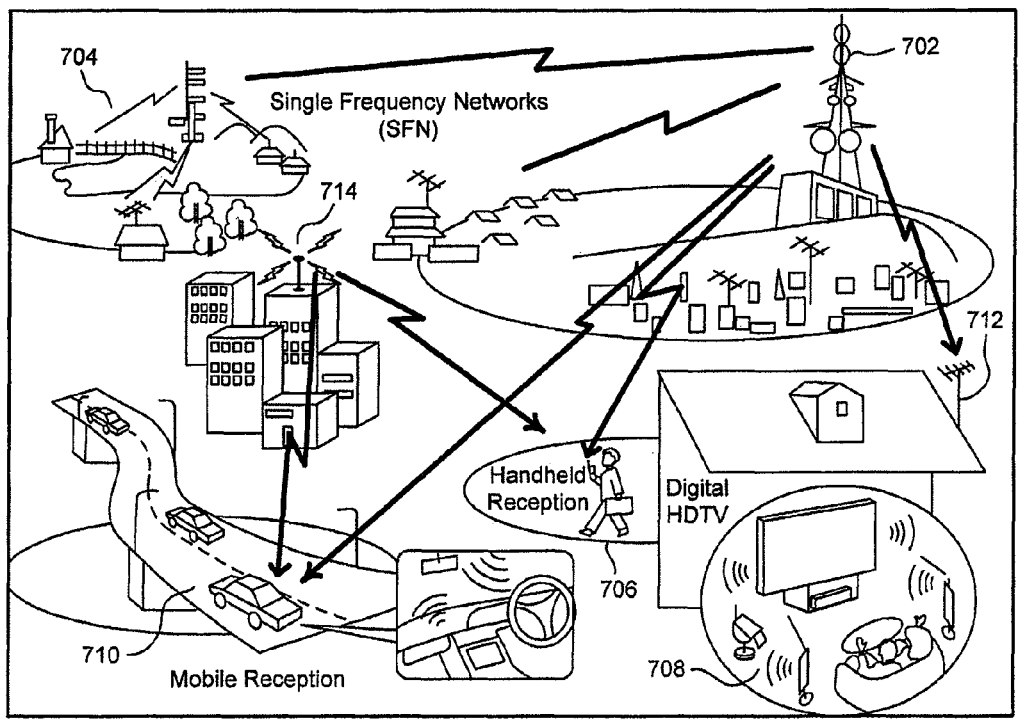
FIG. 7 depicts several possible service modes including mobile, indoor, handheld, and fixed services receiving data from a single frequency network providing enhancements in accordance with the present invention.

FIG. 7 depicts several possible service modes including mobile 710, indoor 708, handheld 706, and fixed 712 services receiving data from a single frequency network providing enhancements in accordance with the present invention. The present invention can be used across one or more of the exemplary services shown. The present invention also uses transmitter diversity to provide coherent signals from different locations, such as transmitter 702, single frequency network transmission system 704 and a smaller building transmitter 714.

Frequency synchronization of the pilot or carrier is achieved by locking the carrier frequency of an exciter in the RF transmitter system to a reference from a GPS timebase. Transmitter diversity allows transmitters at different locations to transmit coherent symbols.

The start of a data frame is determined (i.e., synchronized) by identifying a point in the transport stream via a special timing packet. Generally, a transport stream (TS) having a specialized timing packet is generated at a broadcast installation. The TS rate is locked to a GPS clock (e.g., 10 MHz), and the GPS temporal reference (e.g., 1 PPS) is used to construct the timing packet. The synchronization packets identify a cadence "epoch" point in the TS, which is used to slave all the data frames to be broadcasted from one or more RF transmission systems, and hence provide data frame synchronization (DFS).

The present invention further provides a deterministic initialization of the Trellis coder memories by creating packets with predetermined data patterns located at deterministic positions throughout a data frame. The predetermined data patterns are transmitted from the broadcast station to an exciter to cause its Trellis coder states to be initialized in a fixed predictable fashion. Data frame synchronization and Trellis coder synchronization can thus occur using a single initialization packet.

Figure 5:
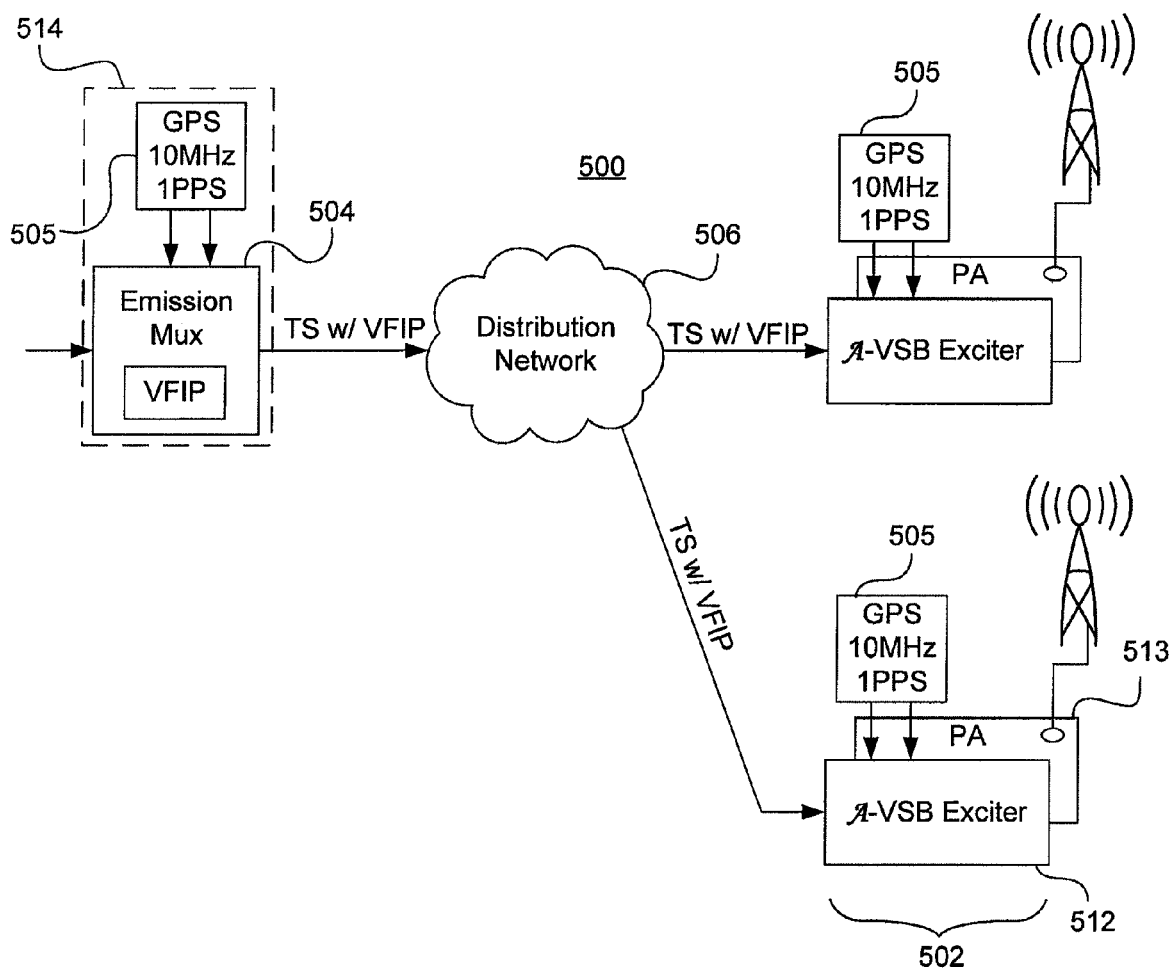
FIG. 5 is a system diagram of an exemplary SFN in accordance with an embodiment of the present invention.

FIG. 5 is a system diagram of an SFN 500 in accordance with an embodiment of the present invention. A transport stream emitter 514 in a broadcast installation such as a studio or network operations center ("NOC") is fed a data stream (e.g. MPEG-2 data stream). Transport stream emitter 514 transmits the data stream to a distribution network 506 in the form of a transport stream (TS) having VSB frame initialization packets (VFIPs). VFIPs are specialized synchronization packets generated by an emission multiplexer 504 of the transport stream emitter 514. In one embodiment, a VFIP module within an emission multiplexer 504 generates VFIPs. The TS with a VFIP is transmitted to one or more transmission systems 502 through a distribution network 506 (e.g., fiber, satellite, microwave and the like). Emission multiplexer 504 is clocked by a GPS timebase 505.

RF transmission systems 502 down stream from the broadcast installation include an exciter 504 which can detect the VFIPs in the transport stream. In addition, RF transmission systems 502 include other components such as power amplifiers (PAs) 513. As noted above exciters are also sometimes referred to as modulators.

In one embodiment of the present invention, emission multiplexer 504 as well as all the other nodes in SFN 500 are clocked by a common timebase, GPS timebase 505. Frequency synchronization of the pilot or carrier is thus achieved by locking the carrier frequency of exciter 512 to the 10 MHz reference from the GPS timebase 505 to regulate the apparent Doppler shift seen by ATSC receiver from the SFN in overlapping coverage areas.

As explained above, data frame synchronization requires that all exciters in an SFN choose the same packet from the incoming TS to begin a VSB data frame. In the present invention, each exciter 512 follows the frame synchronization timing of emission multiplexer 504 to achieve initial frame synchronization and to maintain this condition.

Emission multiplexer 504, has its data rate locked to the GPS reference 505, and initiates frame synchronization by selecting one of the TS packets to begin a VSB Frame. Once an initial TS packet has been selected to start the count, emission multiplexer 504 counts 623 TS packets inclusive of the selected packet (e.g., 0-622) emission multiplexer 504 inserts a VFIP as the last (623) packet. This corresponds to a container of data (624 packets) which is equivalent to the payload in an ATSC A/53 VSB frame having 624 payload segments.

Figure 6:
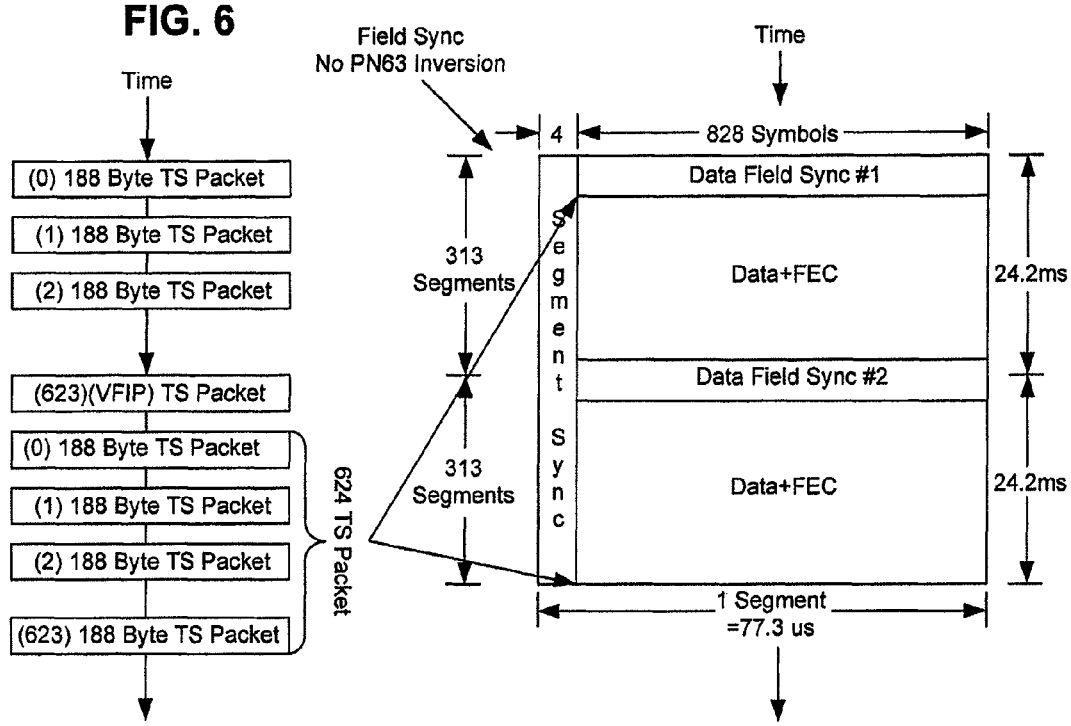
FIG. 6 illustrates a method for inserting VSB frame initialization packets (VFIPs) in accordance with an embodiment of the present invention.

Emission multiplexer 504 inserts a VSB frame initialization packet (VFIP), as shown in FIG. 6. By the placement of VFIP in the last packet slot (623) signaling of a VSB frame is made implicit. Upon reception of the VFIP, each exciter 512 is signaled to the start a new data frame after the last bit of VFIP packet is received. The cadence also referred to as timing or frame rate of the VSB frames is thus based on the frame synchronization timing which is maintained by emission multiplexer 504. Since emission multiplexer 504 is locked to GPS timebase 505, the 0-623 packet count becomes the cadence of the VSB frame rate. After the first VFIP insertion, additional VFIPs or slices of packets containing service content can be inserted subsequently thereafter at a predetermined periodicity (e.g., approximately once per second). For example, whenever emission multiplexer 504 inserts a VFIP, it will appear in the 623 slot as determined by a cadence counter in emission multiplexer. Slices can also be inserted on a dynamic basis since signaling provides receiving devices with a deterministic mapping as to when the service content will be broadcast.

Figure 8:
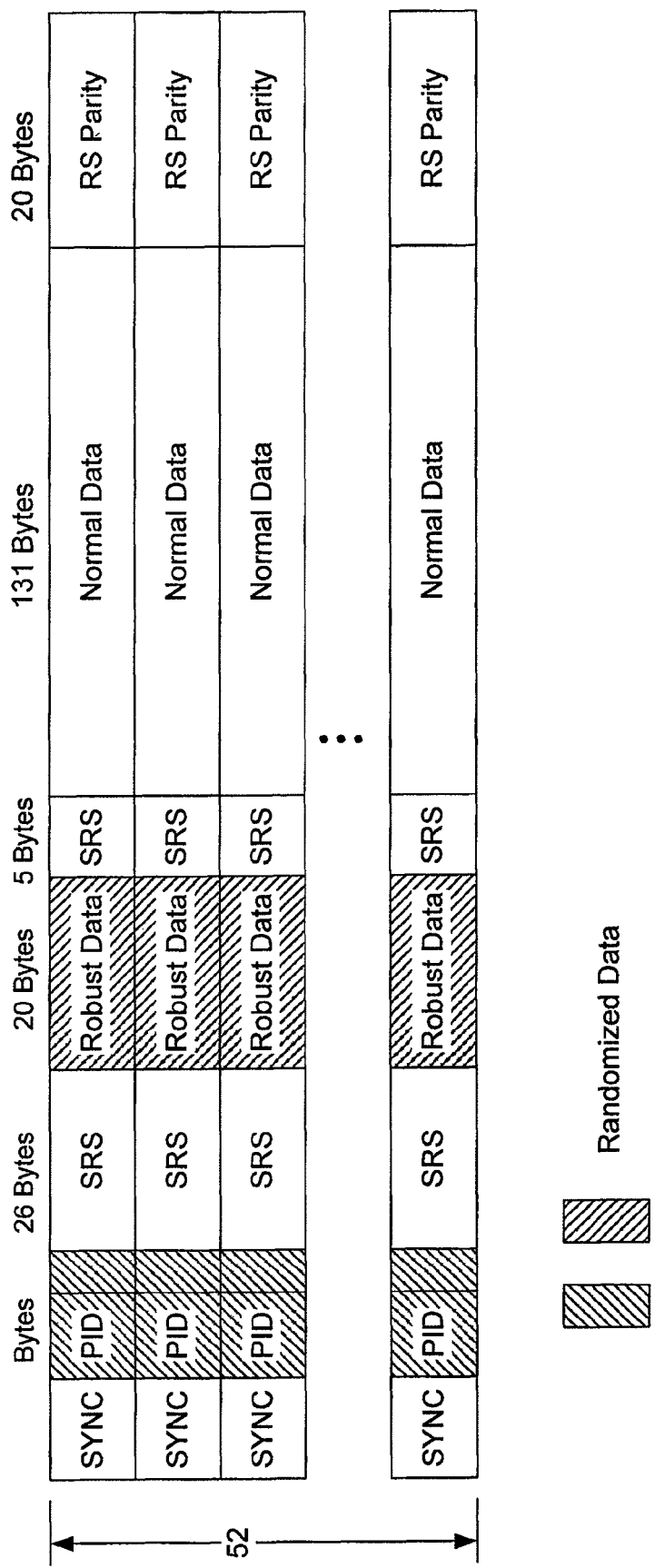
FIG. 8 depicts the structure of a slice of 52 packets created from the received packets and before entering the interleaver stage of a modulator in accordance with one embodiment of the present invention.

FIG. 8 depicts the structure of a slice of 52 packets created from the received packets before entering the interleaver stage 106 of exciter 512 in accordance with one embodiment of the present invention. As described above, the position of bytes in the packets are based on the a priori knowledge of the interleaver. It should be understood that FIG. 8 is conceptual and shows an arrangement of fields within each packet in accordance with one exemplary interleaver mapping. The packet arrangements (i.e., field positions) will be different depending on the interleaver mappings. Accordingly, the placement of fields of the segments in different locations in accordance with other interleaver mappings is within the scope of this invention.

As shown in FIG. 8, each packet includes a packet identifier (PID) field stored in the header portion of the packet and a SYNC field. The SYNC (e.g., an MPEG sync) allows for synchronization of transport stream packets. Exciter 512 replaces the SYNC with a segment sync. The packet carries additional information such as training information (SRS), as well as service specific content. In the example shown in FIG. 8, the service specific content is outer layer encoding (Robust Data). Normal content also is carried in the packets in the Normal Data field.

Exciter 512 identifies each packet by its PID. In an exemplary embodiment, exciter 512 identifies a packet as a VFIP when its PID value is 0x1FFA. After the VFIP packet has been read, exciter 512 inserts a VSB data field sync. Referring to FIG. 6, the frame payload segments thus begins after Data Field Sync #1. Exciter 512 in turn makes a determination whether 312 TS packets have been received. If so, exciter 512 inserts additional DFSs per the A/53 standard.

As described in the ATSC A/53 standard, a DFS includes a series of pseudorandom number (PN) sequences of length 511, 63, 63, and 63 symbols, respectively. The PN63 sequences are identical, except that the middle sequence is of opposite sign in every other field sync. This inversion allows the receiver to recognize the alternate data fields comprising a frame. In Data Field Sync #1 all three PN63 sequences are in the same phase and in Data Field Sync #2 the middle PN63 sequence is inverted and the other two have the same phase. The exciter 512 inserts a DFS with no PN63 inversion directly after the last bit of the VFIP packet and then continues with normal VSB frame construction starting with next TS packet (0) as the first data-segment of the next VSB frame.

If an exciter 512 has already been frame synchronized, a received VFIP packet can be used to verify the exciter is still in phase with the frame cadence maintained in the emission multiplier because of the implicit placement of VFIP in the transport stream. Similarly, sync inserter 110 inserts the data field syncs to generate data frames containing slices of service content.

As explained above, it is also necessary to develop a state condition for the Trellis coder memories to be applied at a specific epoch in the data stream simultaneously by all transmitters in a network. The present invention uses a deterministic Trellis reset (DTR) to perform Trellis coder synchronization by forcing the Trellis coder to go into a known (e.g., zero) state as the VFIP packet enters the Trellis coder.

Trellis coder synchronization is accomplished based on a priori knowledge of the location of the interleaved VFIP packet at the output of byte data interleaver 106 (FIG. 1) before the Trellis coder stage 108 (FIG. 1). With the knowledge of the output of the ATSC interleaver 106 once the data frame synchronization data has been achieved, twelve predetermined byte positions in VFIP are identified and used to trigger a DTR in each of the twelve Trellis coders in all of the exciters in the SFN. The initialization occurs as soon as each of these deterministically assigned bytes first enter its designated Trellis coder. More particularly, all Trellis coders are synchronized after the first four (4) segments of the VSB Data Frame without any need for any syntax in VFIP itself. Additional syntax can be added to control the emission timing and other auxiliary transmitter functions. Thus, by using emission multiplexer 504 to insert a VFIP, VSB frame synchronization is implicitly signaled. By the time the fourth data segment of a new VSB frame is transmitted, all Trellis coders in all exciters will be deterministically reset to a common zero state. Coherent symbols will be produced by all transmitters in SFN. Enhanced services in accordance with the present invention will now be described in more detail.

Figure 9:
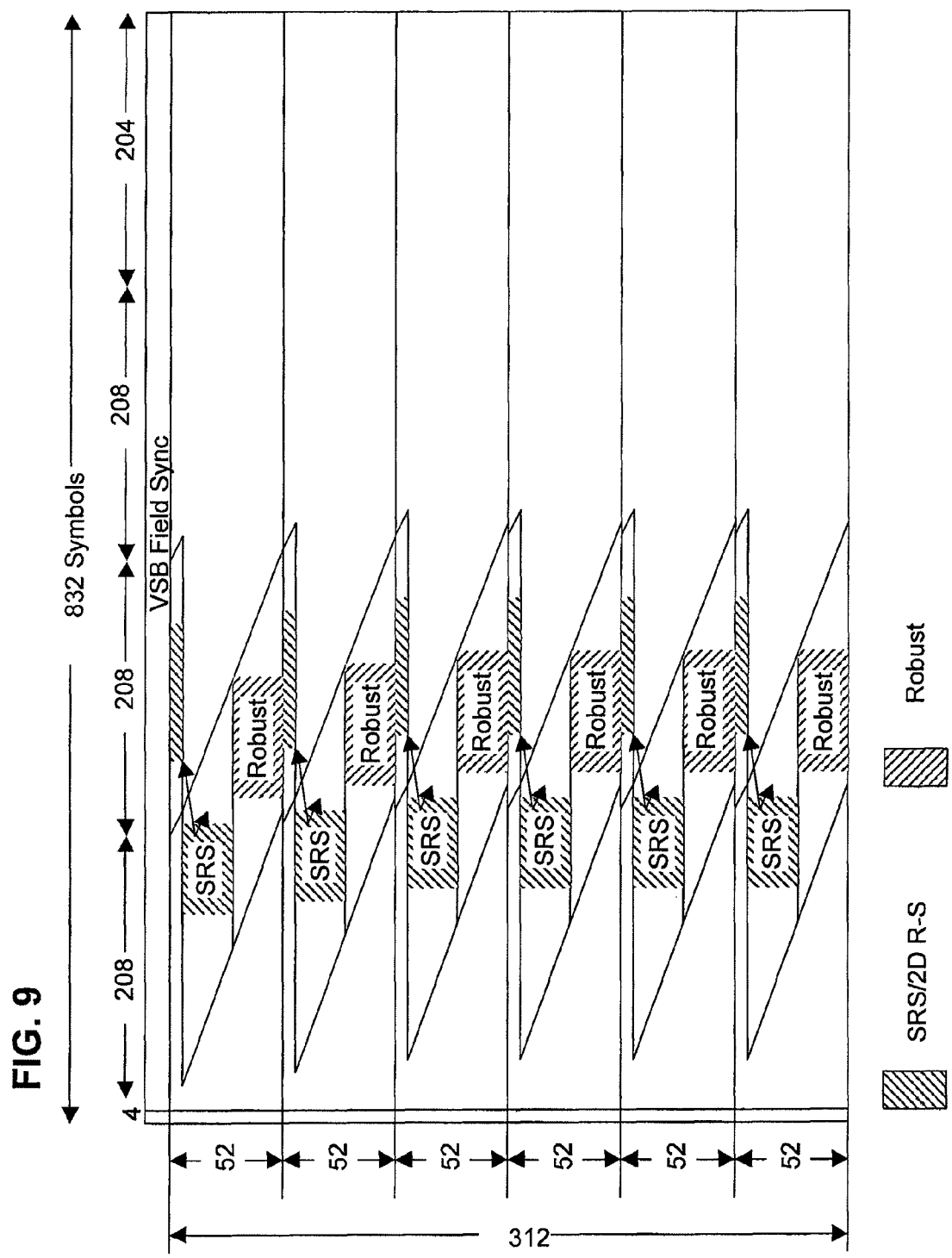
FIG. 9 depicts transmission of several slices of segments using static mapping in accordance with an embodiment of the present invention.

FIG. 9 depicts transmission of several slices of segments generated by exciter 512 using static mapping in accordance with an embodiment of the present invention. In particular, one data frame (i.e., 312 data segments) is divided into 52 segment slices carrying training information (SRS) and robust data. The training data can be used, for instance, to synchronize Trellis coders as described above, and the robust data can be used, for instance, to provide an additional layer of coding to provide better reception in handheld devices, power conservation services, and the like. As shown, every training field and robust data field is repeated on a static basis. It should be understood that to simplify the discussion of the static mapping shown in FIG. 9, dispersions of the segments caused by an interleaver in exciter 512 are not shown. A conceptual mapping of such dispersions caused by the interleaver 106 in exciter 512 is discussed below in more detail with reference to FIG. 17.

Figure 10:
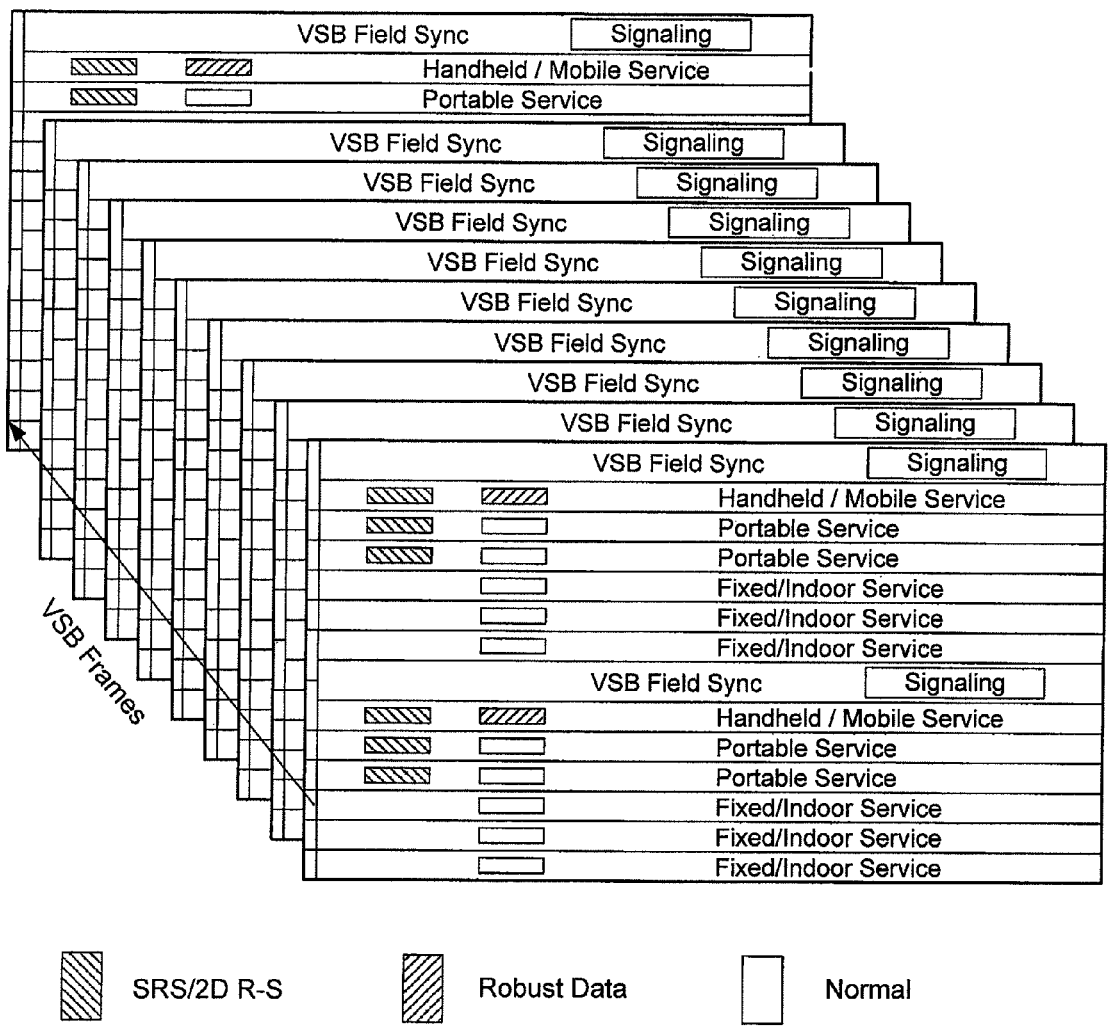
FIG. 10 depicts transmission of several slices of segments dynamically assigned across a VSB frame, in accordance with an embodiment of the present invention.

FIG. 10 depicts transmission of several slices of segments dynamically assigned across a VSB frame, in accordance with an embodiment of the present invention. Each frame carries data placed in locations known to correspond to different services (e.g., handheld/portable, mobile, fixed/indoor, and the like).

Emission multiplexer 504 provides the signaling information to each exciter 512 to provide announcements of services and their corresponding mappings. Exciter 512 extracts and buffers this information. Once buffered, sync insertion unit 110 in exciter 512 reinserts this information into a reserved field in the data field sync area (shown as the "Signaling" block in FIG. 10). In ATSC, this reserved field is a 104 byte reserved area. Advantageously, this process uses place-holder bytes in the SRS field to carry signaling information between emission multiplexer 504 and exciter 512. The place-holder bytes are discarded by exciter and precalculated bytes are inserted in their place to create training signals. This place holder data space can thus be reused as a relatively high data rate (e.g., 1 MBit/sec) signaling channel, providing receivers with the option of discovering and consuming enhanced services. Heritage receivers will ignore this data and continue normally, and as such the present invention is backwards compatible.

A particular receiving device uses the signaling information to learn what information it will be receiving and at what time. In particular, the signaling information includes information identifying the availability of services as well as a deterministic mapping of the service content. The information can be used to deterministically map service content for different types of services, as well as for providing training information or Trellis coder synchronization information.

Legacy receivers will still be able to receive normal data. Through the signaling information provided, devices will be able to discover the service that is present and its mapping across a number of frames. Once a receiver device has the mapping, it will then have the ability to obtain and use training signal data, robust data, and other enhancement data. As shown in FIG. 10, more than one frame can be setup and signaled, allowing services to be mapped across the series of frames. Signaling can also be used to communicate to the receiving devices that enhancements will be suspended for a predetermined time, thus notifying to the receivers that only normal data will follow during that time.

Figure 11:
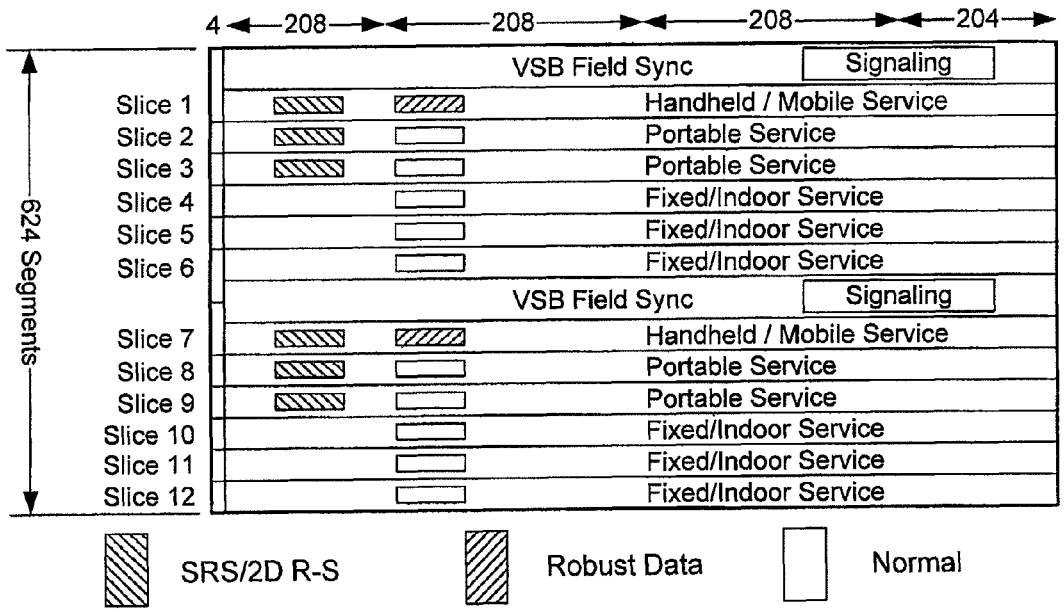
FIG. 11 depicts an exemplary synchronous VSB frame, implemented for various services using static mapping, in accordance with the present invention.

FIG. 11 depicts an exemplary synchronous VSB frame, implemented for various services using static mapping, in accordance with the present invention. Several services, including handheld/mobile, portable and fixed/indoor services are provided with enhanced feature capabilities by receiving packets of data at known points in time. In this example, each of the 12 slices within a data frame is assigned to a corresponding service. A packet can carry training information (SRS), additional coding (Robust Data), or simply normal data. A receiver extracts and demodulates the data in a slice corresponding to its service and performs an appropriate response.

Figure 12:
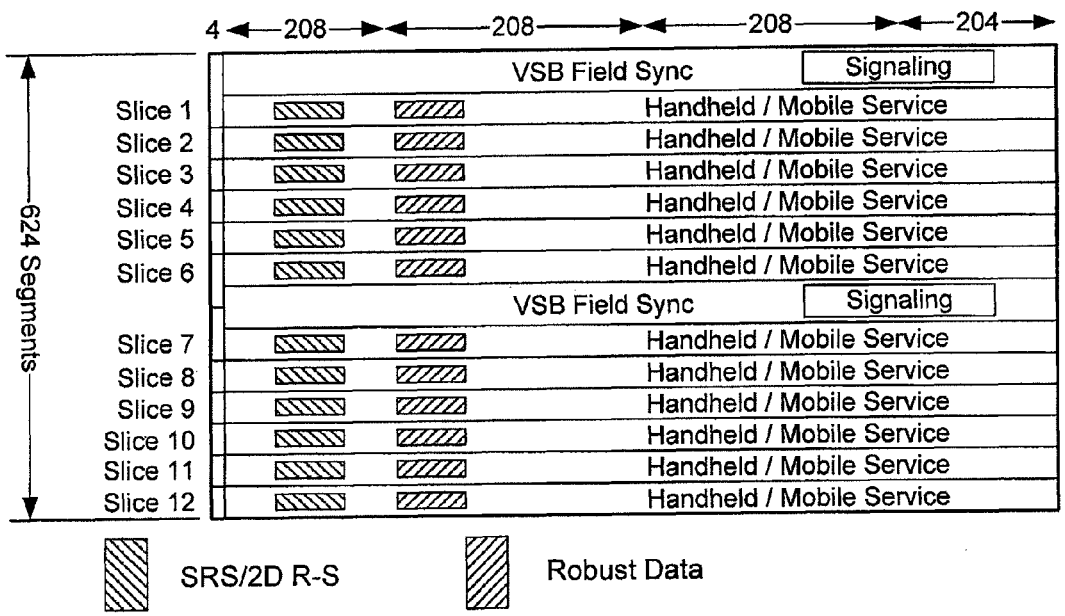
FIG. 12 depicts an exemplary burst of slices, in accordance with an embodiment of the present invention.

FIG. 12 depicts an exemplary burst of slices, in accordance with the present invention. Multiplexer 504 receives a digital signal and buffers a block of the received packets corresponding to the service content. In turn, multiplexer 504 transmits the block of packets at predetermined points in time. The multiplexer 504 also performs flow control of the bursts to control the timing of the bursts such that the buffers of the receiver are not overflowed or underflowed, maintaining buffer fullness.

Transmitting a block of packets as bursts of data allows a battery powered receiver (e.g., handheld device) to power up and buffer the block of data at deterministic points in time and to power down unneeded power consuming circuits between the bursts. Circuits can thus be powered up in anticipation of the next burst. The battery-powered receiver performs operations on the data in the buffer when powered. In this embodiment, slices are burst at a multiple of a predetermined number of seconds (e.g., 1 second). In addition, each slice of data can be burst contiguously, without gaps between the service content. Alternatively, the slices can be transmitted substantially contiguously with gaps between groups of service content. Thus additional "normal content" can be transmitted between the bursts (e.g., MPEG encoded data).

Signaling information in the signaling field can be used to instruct a receiving device when the next slice should be expected, allowing the service content (e.g., burst of packets) to be transmitted or received either at a predetermined periodicity or on an dynamic basis.

Figure 13:
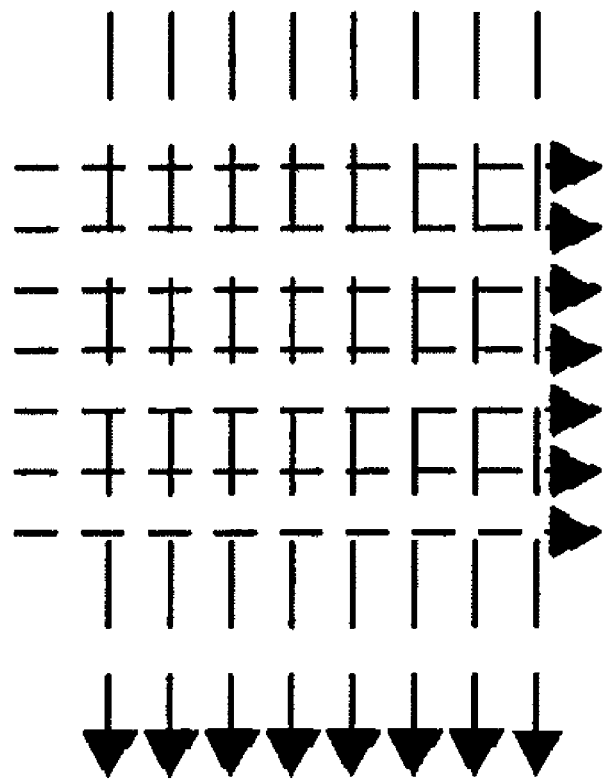
FIG. 13 depicts two-dimensional (2D) Reed Solomon (RS) coding in accordance with one embodiment of the present invention.

FIG. 13 generally depicts two-dimensional (2D) Reed Solomon (RS) coding in accordance with one embodiment of the present invention. As shown, outer forward error correction (FEC) coding, such as for example 2D RS coding, is performed to provide a more robust signal. Since the additional coding has its own parity and is coded in the transverse direction, data transmitted with such additionally coding has a better chance burst error recovery. In the exemplary embodiment depicted in FIG. 13, the outer coding is performed by the emission multiplexer 504 in the transverse direction of the normal ATSC lateral RS coding, which is performed on the data in the exciter 512. The present invention thus provides coding gain and additional time diversity, thereby increasing robustness. The inverse processes performed in both multiplexer 504 and exciter 512 are performed on the receiving devices.

It is not necessary to encode all the data with the additional coding algorithm. This provides for efficient use of network bandwidth as well as allows more enhancements to be provided to a wider scale of devices. This further allows the quality of service (QoS) to be controlled on a per service basis. In addition, the present invention dramatically improves the normal lateral RS threshold of visibility (TOV) and provides improved time diversity. Using enhanced outer coding also improves impulse noise and intra-frame dropout correction and can be used to compensate for known impulse noise on low VHF DTV.

Figure 14:
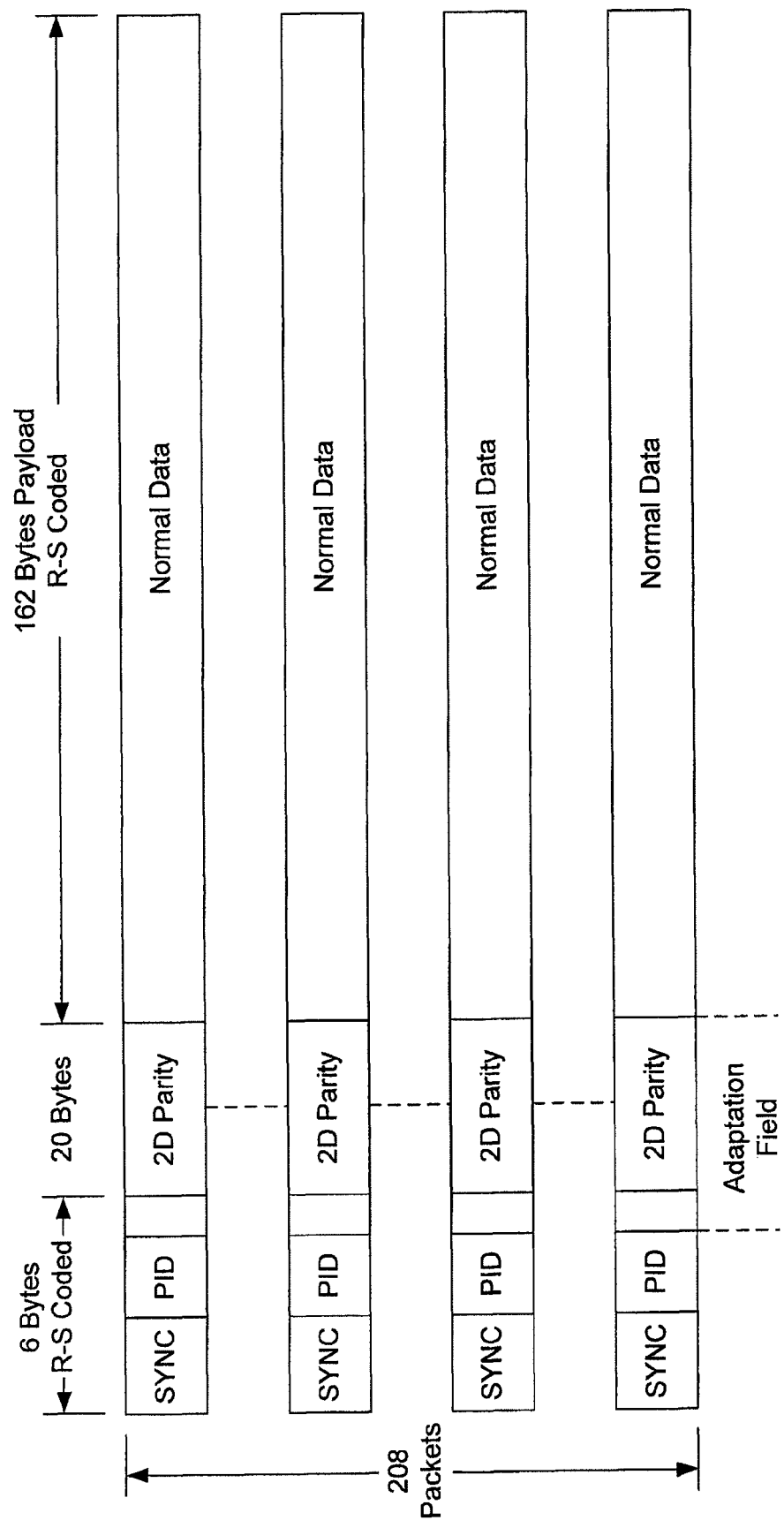
FIG. 14 illustrates the structure of packets in accordance with the present invention on which additional forward error correction (FEC) coding has been performed.

FIG. 14 illustrates the structure of packets in accordance with the present invention on which additional forward error correction (FEC) coding has been performed in multiplexer 504. As shown, normal data has been RS coded within a 162 byte payload field and 6 bytes of the packet are used to store the packet header as well as a portion of a predefined adaptation field. The parity data corresponding to the additional outer correction coding also is placed in an area in the adaptation field for private use. The example in FIG. 14 shows the private data containing the parity data for the additional outer FEC coding. Normal decoders will ignore the private data (e.g., 2D Parity data). A complementary receiver, however, would perform the inverse process on the private data to decode it.

Figure 15:
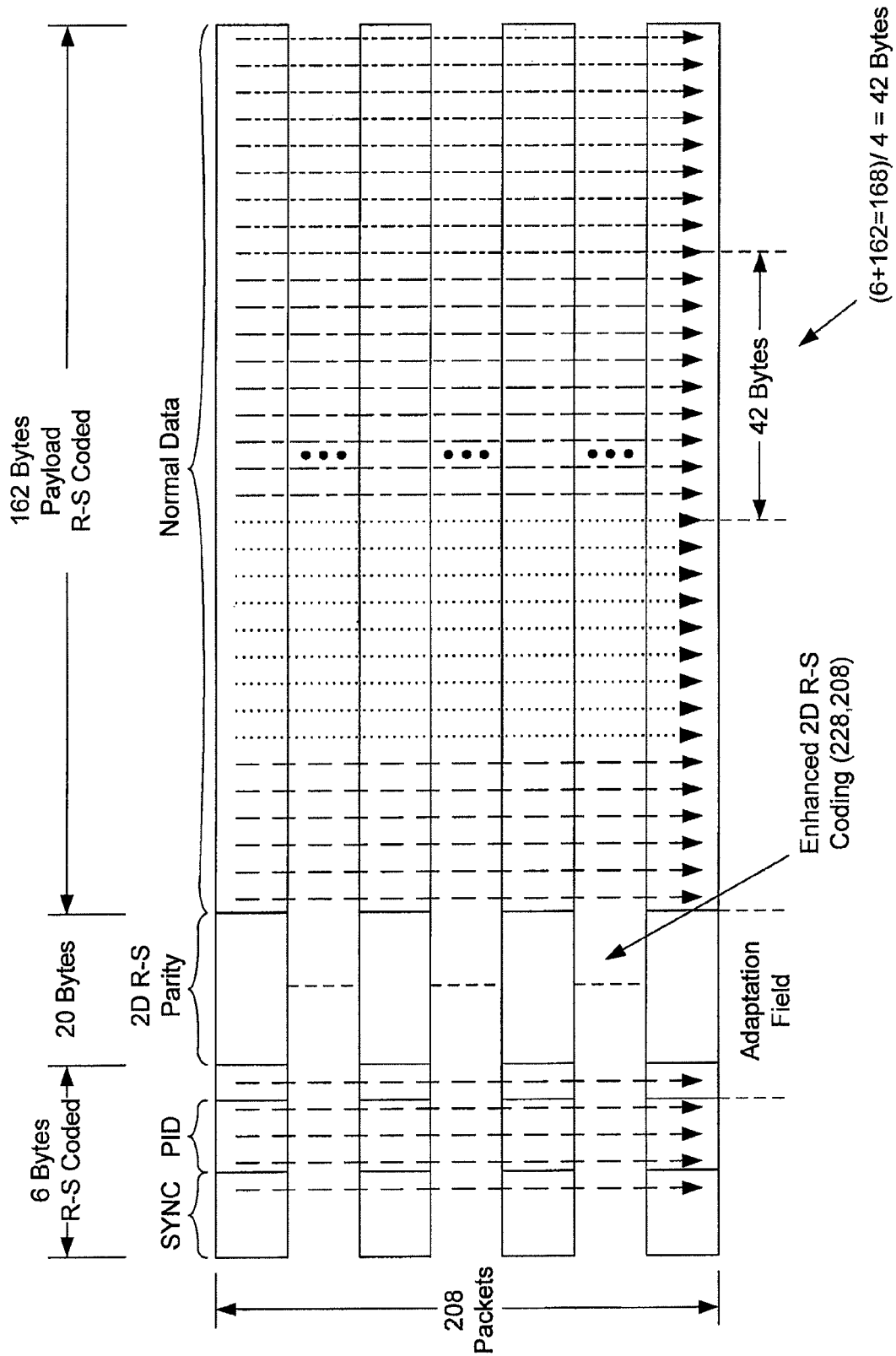
FIG. 15 illustrates the structure of packets in accordance with the present invention on which additional forward error correction (FEC) coding has been performed.

FIG. 15 expands on FIG. 14 to illustrate the structure of packets in accordance with the present invention on which additional forward error correction (FEC) coding has been performed. This example is similar to FIG. 14, except that the additional outer correction coding is performed over four packets. The first 42 bytes across the packet are transverse coded. As the arrows show, parity data corresponding to the transverse coded data is placed in the 2D RS Parity fields in the adaptation field of the 52 blocks of packets.

As shown in FIG. 15, 208 packets are shown which have been grouped into four (4) slices. The four slices are grouped into a block and transverse coding is applied to the block, where the parity bytes are placed within the block (2D R-S Parity). Emission multiplexer 504 can control time diversity by controlling where slices will be placed within a data frame as well as the particular data frame. For example, emission multiplexer 504 can control where each of the 4 slices shown in FIG. 15 will be inserted into frames by exciter 512, thus separating the slices by a predetermined time (e.g., placing the first slice of one frame into a frame five frames later and repeating the process every five frames). This provides virtual interleaving and strengthens the correction capability over bursty channels. The block of packets is then transmitted over distribution network 506 in the transport stream to the exciter 512, which in turn interleaves the block of packets. Also as is well known, the inner/inter-interleaving sparses the block in time. Referring to FIG. 17, the slices will thus appear in different groups of the interleaved data, with normal content between the groups. Since the mapping of interleaved data is deterministic, a receiver having the deterministic mapping can regroup and decode the original content. The blocks of packets can be interspersed throughout the transport stream either across a single data frame or across multiple data frames. In other words, the original content is not transmitted contiguously. This time diversity now possible by deterministic nature of VSB frame will help mitigate bursty channels.

Figure 16:
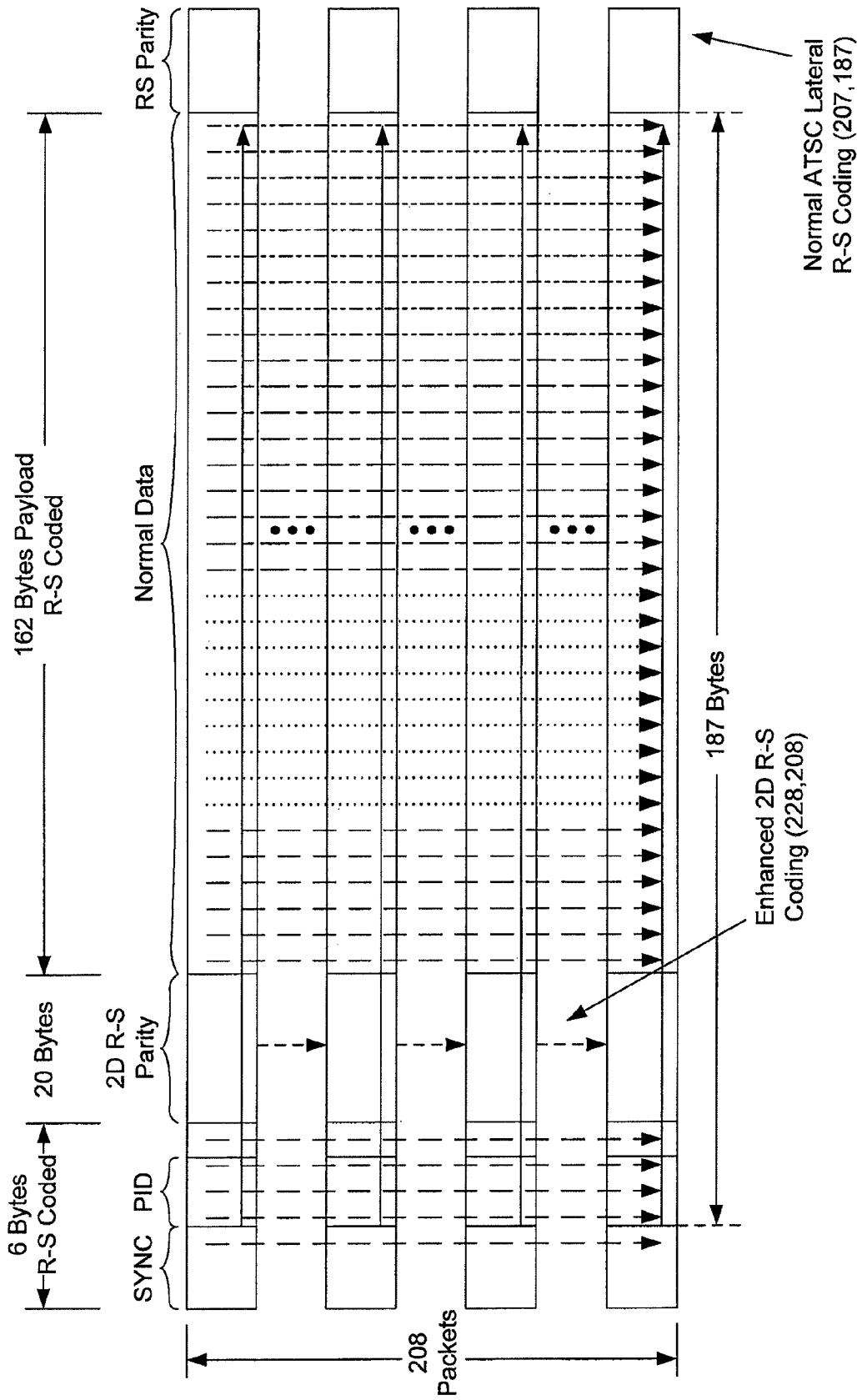
FIG. 16 illustrates the structure of segments after they have been encoded with additional forward error correction (FEC) coding and after normal RS coding from an ATSC modulator.

FIG. 16 illustrates the structure of segments after being encoded with additional FEC coding and after normal RS coding from exciter 512. As shown in FIG. 16, the normal ATSC lateral RS coding is appended to each segment (RS Parity). This two dimensional coding benefits from time diversity. Upon interleaving, the time diversity and dispersion provides an uncorrelated channel condition, thereby providing better protection against burst type channel errors.

FIG. 17 depicts the memory map of a convolutional byte interleaver showing the dispersion of the parity and the dimension of encoding. In particular, FIG. 17 shows the dispersion of the parity bytes and the arrows show the dimensions (i.e., lateral and transverse) in which they were encoded. As discussed above, the additional outer-level creates an uncorrelated channel condition (i.e., time diversity), the result of which is better protection against burst type channel errors. The dispersion of the bytes shown in FIG. 17 will change in accordance with the mapping performed by the interleaver. Accordingly, it should be understood that the mapping is conceptual and shows one exemplary interleaver mapping. Accordingly, other interleaver mappings of the data dispersion in accordance with other interleavers may be utilized and still be within the scope of this invention.

The present invention is not limited to multiple transmitter system and may be implemented in a single transmitter system. Frame synchronization was described above in terms of an SFN where a VFIP was used to performing frame synchronization and Trellis coder synchronization. A single transmitter system may not need Trellis coder synchronization. Accordingly, other forms of frame synchronization may be utilized to provide the deterministic mapping described above and still be within the scope of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for modulating, comprising the steps of:
    receiving a digital signal from a transport stream;
    generating a data frame from the digital signal, wherein the data frame is divided into a predetermined number of segments, wherein at least one grouping of the predetermined number of segments contains a service content; and
    modulating the at least one grouping in accordance with a deterministic mapping into a physical layer by inserting an initialization packet containing a plurality of stuff bytes positioned in predetermined byte positions into the digital signal, respectively, for setting each one of a plurality of Trellis coders to a predetermined state as a corresponding stuff byte enters,
    wherein the service content is recognized at known symbol locations within the physical layer based on the deterministic mapping.

2. The method according to claim 1, wherein at least one grouping contains a normal broadcast content.

3. A modulator, comprising:
    a receiver operable to receive a digital signal from a transport stream;
    a data frame generator operable to generate a data frame from the digital signal, wherein the data frame is divided into a predetermined number of segments, wherein at least one grouping of the predetermined number of segments contains a service content; and
    a modulation unit operable to modulate the at least one grouping in accordance with a deterministic mapping into a physical layer by inserting an initialization packet containing a plurality of stuff bytes positioned in predetermined byte positions into the digital signal, respectively, for setting each one of a plurality of Trellis coders to a predetermined state as a corresponding stuff byte enters,
    wherein the service content is recognized at known symbol locations within the physical layer based on the deterministic mapping.

4. The modulator of claim 3, wherein at least one grouping contains a normal broadcast content.

5. A modulator, comprising:
    means for receiving a digital signal from a transport stream;
    means for generating a data frame from the digital signal, wherein the data frame is divided into a predetermined number of segments, wherein at least one grouping of the predetermined number of segments contains a service content; and
    means for modulating the at least one grouping in accordance with a deterministic mapping into a physical layer by inserting an initialization packet containing a plurality of stuff bytes positioned in predetermined byte positions into the digital signal, respectively, for setting each one of a plurality of Trellis coders to a predetermined state as a corresponding stuff byte enters,
    wherein the service content is recognized at known symbol locations within the physical layer based on the deterministic mapping.

6. A non-transitory computer-readable medium having control logic stored therein for modulating, which when executed by a computer, causes the computer to:
    receive a digital signal from a transport stream;
    generate a data frame from the digital signal, wherein the data frame is divided into a predetermined number of segments, wherein at least one grouping of the predetermined number of segments contains a service content; and
    modulate the at least one grouping in accordance with a deterministic mapping into a physical layer by inserting an initialization packet containing a plurality of stuff bytes positioned in predetermined byte positions into the digital signal, respectively, for setting each one of a plurality of Trellis coders to a predetermined state as a corresponding stuff byte enters,
    wherein the service content is recognized at known symbol locations within the physical layer based on the deterministic mapping.

7. The non-transitory computer-readable medium of claim 6, wherein at least one grouping contains a normal broadcast content.

* * * * *

UNITED STATES PATENT AND TRADEMARK OFFICE
CERTIFICATE OF CORRECTION

PATENT NO. : 8,208,580 B2
APPLICATION NO. : 12/418072
DATED : June 26, 2012
INVENTOR(S) : Michael Simon It is certified that error appears in the above-identified patent and that said Letters Patent is hereby corrected as shown below:

ON THE TITLE PAGE

ITEM [56] REFERENCES CITED

Foreign Patent Documents
"WO 02/03728" should read --WO 2002/003728--.
"WO 03/009590" should read --WO 2003/009590--.
"WP 04/034064" should read --WO 2004/045064--.
"2004062283 A1" should read --WO 2004062283 A1--.
"2006066617 A1" should read --WO 2006066617 A1--.

Other
"T3/59" should read --T3/S9--.

IN THE SPECIFICATION

COLUMN 1

Line 14, "is hereby" should read --are hereby--.
Line 62, "as multiplexer." should read --a multiplexer.--.

COLUMN 2

Line 41, "is based" should read --are based--.

COLUMN 3

Line 10, "are use" should read --are used--.
Line 37, "time," should read --time--.

Signed and Sealed this
Nineteenth Day of November, 2013

Teresa Stanek Rea
*Deputy Director of the United States Patent and Trademark Office*

Line 57, "shall all" should read --shall all be--.

COLUMN 6

Line 56, "invention," should read --invention--.
Line 67, "is provided" should read --provides--.

COLUMN 8

Line 23, "504," should read --504--.
Line 37, "to the start" should be --to start--.
Line 57, "are based" should read --is based--.

COLUMN 9

Line 13, "begins" should read --begin--.

COLUMN 10

Line 58, "notifying to the" should read --notifying the--.

COLUMN 11

Line 32, "an dynamic" should read --a dynamic--.
Line 39, "additionally" should read --additional--.
Line 40, "chance" should read --chance for--.

COLUMN 12

Line 32, "sparses" should read --spaces--.

COLUMN 13

Line 2, "to performing" should read --to perform--.